United States Patent [19]
Gardner

[11] 3,866,772
[45] Feb. 18, 1975

[54] TWO DECK SPORT TRAILER

[76] Inventor: Dan J. Gardner, 2705 E. Washington St., Indianapolis, Ind. 46201

[22] Filed: Jan. 31, 1974

[21] Appl. No.: 438,434

[52] U.S. Cl................ 214/85.1, 296/23 B, 214/450
[51] Int. Cl.............................................. B60p 3/10
[58] Field of Search ............ 214/85.1, 85, 500, 450; 296/23 B, 1 A

[56] References Cited
UNITED STATES PATENTS
3,116,949  1/1964  Muse ................................. 214/500
3,550,947  12/1970  Kallies.............................. 296/23 B Primary Examiner—Albert J. Makay
Attorney, Agent, or Firm—Woodward, Weikart, Emhardt & Naughton

[57] ABSTRACT

Disclosed is a wheeled trailer frame having an upper and lower deck. An auxiliary frame is adapted for attaching to the base of a conventional camper disclosure and carries wheels which are accommodated on ramp members detachably secured to the trailer frame. The camper can be moved onto the upper deck of the trailer from the side of the trailer, and a boat can be loaded, from the rear end of the trailer. The camper enclosure and boat can thus be loaded and unloaded independently of each other.

3 Claims, 7 Drawing Figures

PATENTED FEB 18 1975 3,866,772
SHEET 1 OF 3

TWO DECK SPORT TRAILER

BACKGROUND OF THE INVENTION

Multiple deck trailers, accommodating a camper on an upper deck and a boat on a lower deck or level, are not unknown in the prior art. U.S. Pat. No. 3,486,786 discloses one form of such structure. The structure embodying the present invention differs from these prior art trailers in that it can accommodate a conventional, fold-down camper enclosure, no specially constructed camper enclosure is required. Further, the camper enclosure and boat can be unloaded from the trailer independently so that after initially unloading the camper and setting up the camp site, the trailer may be subsequently moved to the shore-line for unloading the boat. The trailer can be used for retrieving the boat and moving it to another short-line location without disturbing the camp site. Where the camper must be retained on the trailer, or cannot be unloaded separately from the boat, as in prior art structures, this flexibility of use, leaving the camp site undisturbed, is not possible, and, further, such arrangement require a specially made camper. The concept of the present invention envisages the user utilizing any standard camper of his choice anad any generally conforming size and brand of boat.

DESCRIPTION OF THE PREFERRED EMBODIMENT

Figure 1:
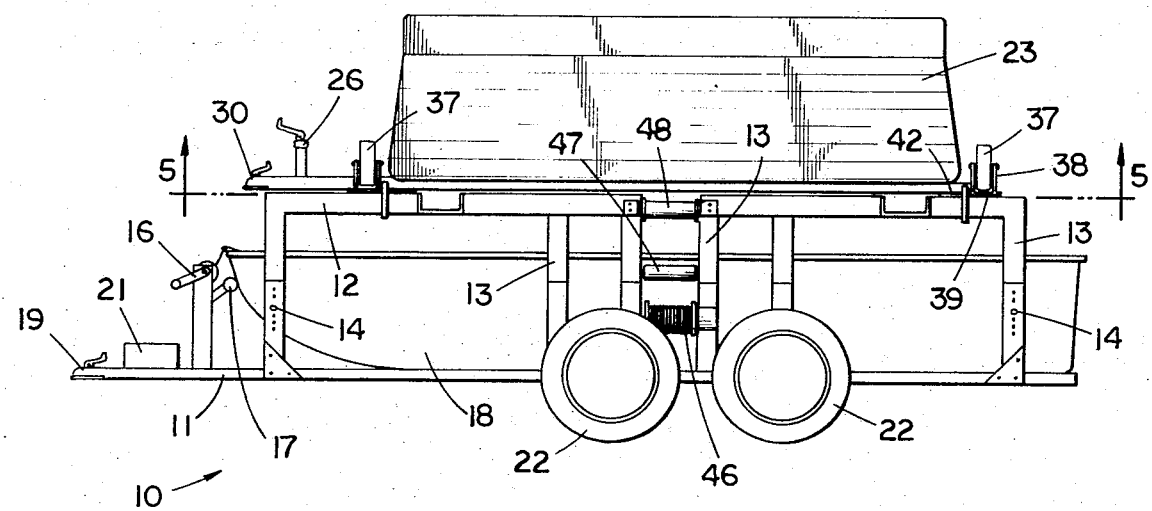
FIG. 1 is a side view of the trailer apparatus embodying the present invention with a camper enclosure and boat loaded on it.

Referring initially to FIG. 1, the apparatus of the present invention includes a wheeled trailer structure, indicated generally at 10, having a lower deck 11 and an upper deck 12. Stationary uprights 13 separate the two deck levels, the stationary uprights being adjustable with respect to their effective length by means of the multiple apertures in the upper and lower components of the uprights, a pin or bolt 14 being disposed in the registering apertures providing a desired effective length of the uprights 13 for accommodating various sized boats. The wheeled trailer structure 10 is provided with a winch 16 and abutment 17 against which a boat 18 accommodated on the lower deck of the trailer rests, the winch 16 being utilized for loading and unloading the boat on the trailer as is conventional. The trailer is provided with a conventional ball hitch 19 and an enclosure 21 housing conventional surge or electric brake apparatus for the trailer wheels 22. The upper deck 12 of the wheeled trailer frame accommodates a conventional camper enclosure 23.

Figure 3:
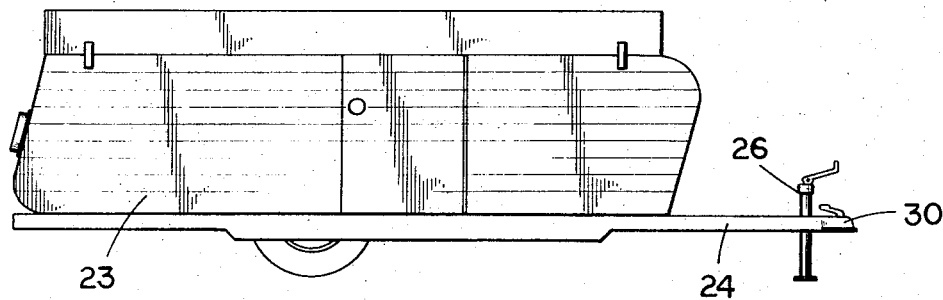
FIG. 3 is side view of a conventional fold-out camper enclosure.
Figure 4:
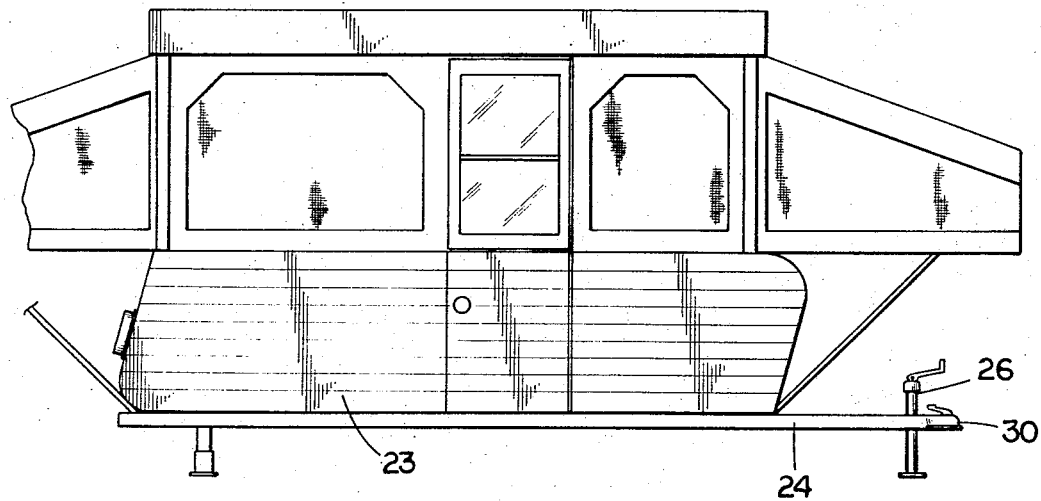
FIG. 4 is a side view of the camper enclosure shown in FIG. 3 but set up for occupancy.

The camper enclosure 23 may be of the conventional fold-down type as illustrated in FIGS. 3 and 4. FIG. 3 illustrates the camper unloaded off the upper deck of the trailer frame and may be seen to include a conventional sub frame 24 having a jack attached thereto identified at 26. FIG. 4 illustrates the trailer in extended condition and ready for occupancy. It will be understood that the structure shown in FIGS. 3 and 4 is conventional.

Figure 2:
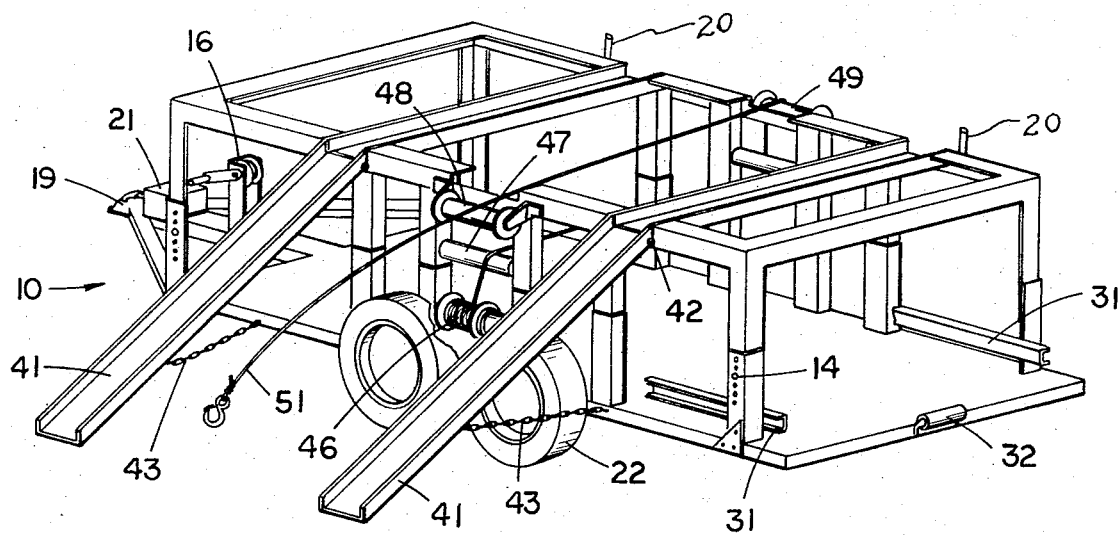
FIG. 2 is a perspective view of the trailer apparatus shown in FIG. 1 arranged for loading of the camper enclosure on the upper deck of the trailer.

As may best be seen in FIG. 2 the lower deck 11 of the wheeled trailer frame is provided with rails 31 and rollers 32 which are conventional for loading a boat on the trailer by drawing it thereon using the conventional winch 16. The trailer might have a solid floor, as shown in FIG. 2, or a framed base with its floor formed by a series of rollers on which the boat is accommodated.

Figure 5:
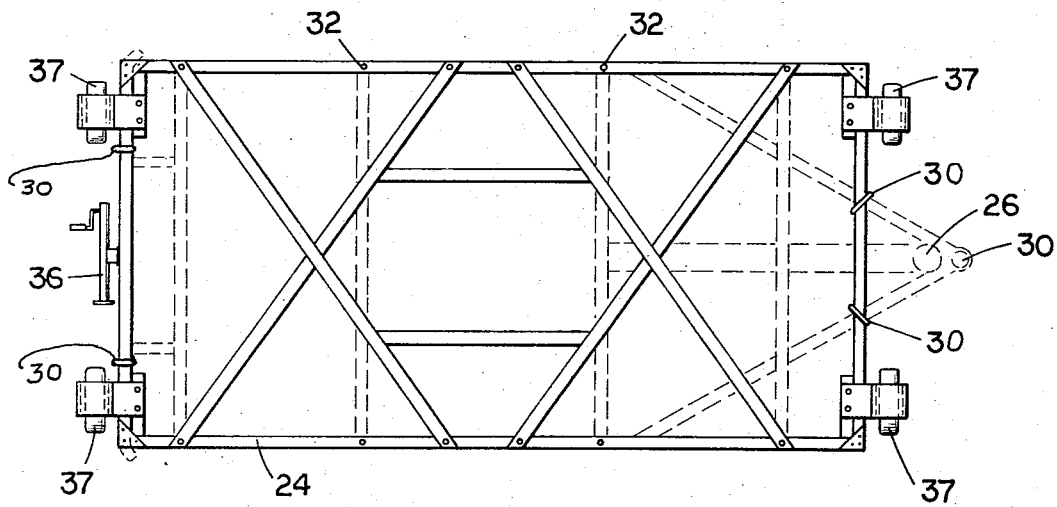
FIG. 5 is a bottom plan view of the auxiliary frame of the present invention secured to the frame of the camper enclosure.

As may best be seen in FIG. 5, in addition to the wheeled trailer frame 10, the apparatus of the present invention includes an auxiliary frame 24, which is shown in solid lines in FIG. 5, the auxiliary frame being generally rectangular in cross section and rigidly attached by means of front and rear clamps 30 and suitable bolts 32 to the conventional sub frame of the camper enclosure, this sub frame generally registering with the auxiliary frame 24 and overlying it. The trailer sub frame will have had its conventional wheels removed prior to attaching it to the auxiliary frame 24, the camper enclosure sub frame being shown in broken lines in FIG. 5 and being provided with the conventional jack 26 and ball hitch 30 shown also in FIG. 3. It will be understood that the only preparation necessary for accommodating the conventional camper enclosure 23 on the apparatus of the present invention is the removal of the camper enclosure wheels, where necessary, and the attaching by means of bolts 32 and U-bolts 31 of the camper enclosure sub frame to the auxiliary frame 24 in generally registering fashion as shown in FIG. 5.

Figure 6:
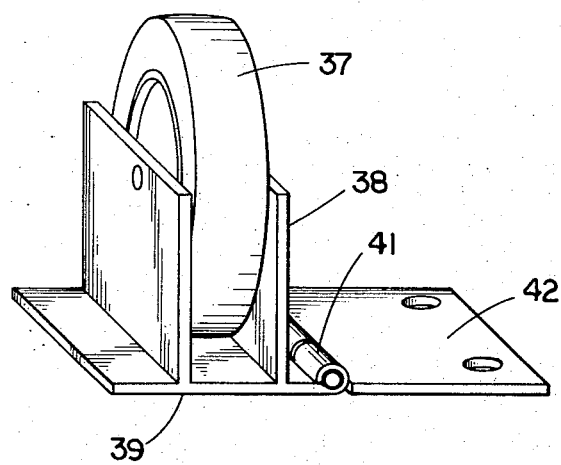
FIG. 6 is a detailed, perspective view of the wheels and their mounting on the auxiliary frame component of the present invention.
Figure 7:
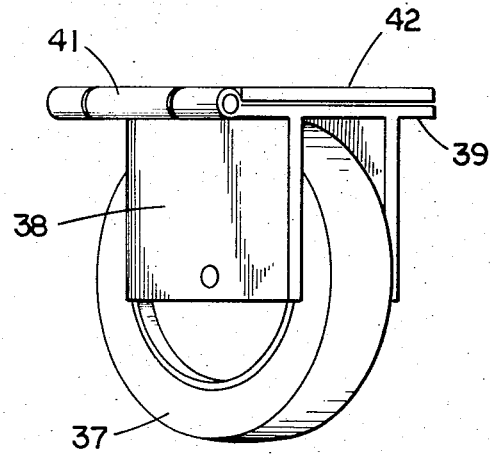
FIG. 7 is a perspective, detailed view of the wheel mounting of FIG. 6 but showing the wheel in supporting position.

The auxiliary frame 24, as may be seen in FIG. 5, is provided with a conventional manually operated jack 36 and the shorter pair of opposed sides of the frame 24 are provided with pivotally mounted wheels 37. The wheels are shown in detail in FIGS. 6 and 7. The wheels are journalled on bearings supported by spaced extending flanges 38 carried by a plate 39 having a hinged connection 41 to a mounting plate 42. The mounting plate 42 is secured by welding or any other suitable means to the frame 24 and the wheels are movable between a stowed position shown in FIGS. 5 and 6 in which they are outboard of the frame 24, and the supporting position, shown in FIG. 7, in which the wheels underlie and support the camper and the frame 24 to which it is attached.

With the camper enclosure 23 and the boat 18 on the wheel trailer frame as shown in FIG. 1, the boat 18 may be unloaded by withdrawing it from the open end of the trailer frame. The camper enclosure together with its sub frame attached to the auxiliary frame 24 may be raised by means of the jack 26 at its front end and the wheels 37 moved to their supporting position of FIG. 7. The rear end of the auxiliary frame may then be raised by utilizing the jack 36 (FIG. 5) and the rear wheels 28 moved to their supporting position of FIG. 7.

Prior to moving the camper enclosure 23 off the upper deck 24 of the trailer frame, the ramp members 41, normally stowed beside the boat 18 on the lower deck of the trailer frame, are attached to the upper deck, by means of pins 42 as shown in FIG. 2. Each of the ramp members 41 may be provided with limiting chains 43. An electric winch 46 and accompanying idling rollers 47 and 48 cooperate with idling rollers 49 on the opposite side of the upper deck of the trailer frame and with the cable 51. The ramp members 41 are spaced from each other a distance such that they will accommodate the wheels 37 of the auxiliary frame 24 when the wheels are in their supporting position. Stops 20 are bolted or otherwise removably secured to the member forming one side of upper deck 12. With the ramp members 41 in place as shown in FIG. 2 and with the cable 51 attached to a part of the auxiliary frame 24, the camper enclosure 23 may be rolled sidewardly down the ramp members 41, movement being controlled by the winch 46 through the cable 51 and halted by stops 20.

With the camper enclosure 23 unloaded, it may be set up as illustrated in FIG. 4 and the trailer frame 10 may be backed to the shore-line area where the boat is to be unloaded. It will be noted that unloading of the camper enclosure 23 and the boat 18 are entirely independent of each other. Should it be more convenient to place the ramp members on the opposite side from that shown in FIG. 2, this can be done by inserting pins 42 in flanges, provided on the opposite side of the upper deck, after the ramp members have been appropriately positioned. The stops 20 would, in this arrangement, be moved to the opposite side of the deck from that shown in FIG. 2 and the cable 51 would be positioned so that its free end would extend over and rightwardly (as viewed in FIG. 2) of the roller 49. It will be understood that the rear pair of the wheels 37 could be mounted to as to be capable of being aligned longitudinally rather than transversely to the major axis of the auxiliary frame 24, to thereby permit the frame 24 to be towed longitudinally for a short, positioning distance when its fron end is elevated. If it is desired that the camper be utilized without removing it from the wheeled trailer frame, a small platform (not shown) at a level equal to the upper deck of the wheeled trailer frame may be provided, the platform being positioned just below the bottom of the camper door and having an attached ladder and hand rail.

I claim:

1. A trailer for transporting both a camper enclosure and a boat in stacked relation comprising, in combination, a wheeled trailer frame having an upper and a lower deck separated by upright frame members and a hitch at one end adapted for securing to a towing vehicle, an auxiliary frame of generally rectangular configuration adapted for attachment to the underside of a conventional camper enclosure, said auxiliary frame carrying wheels on the shorter pair of opposed sides of the auxiliary frame, said wheels having a pivotal connection to said auxiliary frame and thereby moveable between a supporting position in which they underlie and support the camper and a stowed position in which they are disposed in non-supporting position outboard of the camper, inclined ramp members detachably secured to said trailer frame adjacent said upper deck and spaced apart an amount corresponding to the space between the wheels on said auxiliary frame when in their supporting position for accommodation of said wheels, a winch on said wheeled trailer frame for drawing said auxiliary frame and attached camper up said ramp members and onto said upper deck, jacking means for temporarily lifting said auxiliary frame and camper to permit said wheels to be moved to their stowed position, means for fastening said camper to said upper deck, said lower deck of the trailer frame carrying longitudinal guide rails and further winch means for drawing a boat onto, and removing it from, said lower deck through the trailing end of said trailer frame, whereby said boat and camper can be loaded or unloaded on said trailer independently of each other.

2. A trailer as claimed in claim 1 in which the effective lengths of said upright frame members are adjustable to adjustably vary the distance between said upper and lower decks.

3. A trailer as claimed in claim 1 in which said opposed ends of said auxiliary frame are each provided with two pivotally mounted wheels which are free to rotate in a plane transverse to the longitudinal axis of the auxiliary frame.

* * * * *